United States Patent [19]

Nemoto

[11] 4,237,439
[45] Dec. 2, 1980

[54] RELEASE ELECTROMAGNET ASSEMBLY

[75] Inventor: Kazuyuki Nemoto, Hachioji, Japan

[73] Assignee: Olympus Optical Co., Ltd., Tokyo, Japan

[21] Appl. No.: 924,932

[22] Filed: Jul. 17, 1978

[30] Foreign Application Priority Data

Aug. 23, 1977 [JP] Japan ............................... 52/101375

[51] Int. Cl.³ .............................................. H01F 7/08
[52] U.S. Cl. .................................... 335/230; 335/79; 335/179
[58] Field of Search ............... 335/230, 229, 234, 170, 335/78, 79, 80, 81, 179, 205–207

[56] References Cited

U.S. PATENT DOCUMENTS

| | | | |
|---|---|---|---|
| 2,876,397 | 3/1959 | Wasson | 335/230 |
| 3,775,715 | 11/1973 | Bosch et al. | 335/230 |
| 4,054,888 | 10/1977 | Kozuki et al. | 354/50 |

*Primary Examiner*—Harold Broome

*Attorney, Agent, or Firm*—Weinstein & Sutton

[57] ABSTRACT

A release electromagnet assembly having a permanent magnet associated with a movable member and which also includes an electromagnet cooperating with the magnet to produce a magnetic attraction therebetween which is effective to constrain the movable member and which is effective to produce a force of repulsion opposing the attraction of the permanent magnet, thereby releasing the movable member for free movement. The permanent magnet has an end pole of a single polarity where it abuts against the electromagnet so that the flux from the magnet partly passes through an external magnetic path external to the yoke of the electromagnet. When energized, the electromagnet produces a flux passing through a magnetic path which is provided internally of the yoke and which opposes the flux from the permanent magnet, thus releasing the movable member from its constraint applied by the permanent magnet.

10 Claims, 24 Drawing Figures

RELEASE ELECTROMAGNET ASSEMBLY

BACKGROUND OF THE INVENTION

The invention relates to a release electromagnet assembly, and more particularly, to such assembly including a permanent magnet associated with a movable member and also including an electromagnet which cooperates with the magnet to produce a magnetic attraction therebetween which is effective to constrain the movable member and which is capable of producing a flux which opposes the flux from the permanent magnet, thus allowing the movable member to be released from constraint by the permanent magnet.

A release electromagnet assembly as may be used in an electrical shutter mechanism of a photographic camera includes a permanent magnet as is well recognized. Specifically, referring to FIG. 1, a conventional arrangement is shown which includes a permanent magnet 101 held sandwiched between yokes 102a, 102b of an integral U-shaped yoke assembly, and also includes a release coil 103 disposed on the magnet 101. Remote ends 102c, 102d of the yokes are effective to hold an armature piece 105 associated with a movable member 104 attracted thereto against the resilience of spring 106 which engages the movable member 104. The coil 103 may be energized to produce a magnetic flux which opposes the flux from the magnet 101, thereby allowing the movable member 104 to be released from constraint.

Such a release electromagnet assembly may be used in an electrical shutter mechanism of the camera, for example, for constraining a shutter closing member for a given period after a shutter opening member has been operated and before the shutter closing member is released by the energization of the electromagnet. A conventional electromagnet assembly of this kind requires the energization of the release coil with a current flow of such magntide which is sufficient to oppose the flux from the permanent magnet. Consequently, the magnetization of the magnet becomes gradually decreased until the attraction is eventually ineffective.

In consideration of such fact, the present applicant has proposed a release electromagnet assembly which again utilizes a permanent magnet for a constraining purpose without dissipating any electric power and which achieves the release by the use of an electromagnet separate from the permanent magnet to produce a flux which opposes the flux from the permanent magnet. The proposed assembly eliminates the initially mentioned disadvantage, and is also free from the aging effect, thus enabling a reliable operation. In addition, a reliable constraining and release operation is assured, thus providing an optimum arrangement for use in photographic cameras and electrical instruments of a reduced size.

Referring to FIG. 2A, an exemplary arrangement of the described release electromagnet assembly is shown in plan view. An electromagnet 1 comprises a channel-shaped yoke 2 which may be formed of a magnetizable material such as ferrite, and a release coil 3 disposed on the yoke 2. A permanent magnet body 4 which is adapted to be attracted by the solenoid comprises permanent magnet 5 having N- and S-poles at its ends adjacent to the ends 2a, 2b of the yoke, and an armature piece 6 formed of soft magnetic iron, permalloy or the like which is adhesively applied to the adjacent surface of the magnet. The body 4 is mounted on a movable member, not shown, by utilizing a hole 5a. The armature piece 6 is held attracted to the ends 2a, 2b of the yoke 2 as a result of the magnetization of the magnet 5, thus constraining the movable member in a given position. In order to release the movable member, the coil 3 may be energized, whereupon a flux is produced along a path a which opposes the flux from the magnet, thus allowing the armature piece 6 to be released and removed from the ends 2a, 2b. It will be seen that the movable member can be maintained in a given position without requiring any power, and the power is used only when it is desired to release the movable member. The purpose of the armature piece 6 applied to the magnet 5 is to provide a shunt path for the flux from the electromagnet, thus allowing the required repulsion to be produced with a reduced current flow, thereby improving operating efficiency.

FIGS. 2B, 3 and 4 show other examples of the release electromagnet assembly of the type mentioned above. In FIG. 2B, the body 4 comprises a pair of permanent magnets 5A, 5B which are separated by an interposed non-magnetic body 7. The magnets 5A, 5B have N- and S-poles, respectively, at their end abutting against the ends 2a, 2b, respectively, of the yoke 2. An armature piece 6 of a magnetically soft material is applied to the attracted side of the magnets while an iron piece 8 is applied against the other surface, thus providing a sandwiched structure. The provision of the iron piece 8 improves the efficiency of the electromagnet 1 by allowing a flux path a to pass through the iron piece.

The electromagnetic assembly of FIG. 3 is similar to that shown in FIG. 2A except that a mounting piece 9 is adhesively applied to the permanent magnet 5. The piece 9 is again formed of a magnetically soft material, and is applied to the opposite surface of the magnet from the armature piece 6. This achieves the similar effect as the electromagnet assembly shown in FIG. 2B.

In FIG. 4, a mounting piece 9 is integrally secured to an electromagnet 1 so as to be movable while a permanent magnet body 4 is stationary. In this instance, the attracted portions of the yoke 2 are located on the opposite or rear ends thereof, and are directly attracted to N- and S-poles of a permanent magnet 5. The body 4 includes an iron piece 10 in addition to the magnet 5, the piece 10 being adhesively applied to the opposite surface of the magnet from the attracting surface. A flux loop b is formed as shown.

In the arrangements described above in which the energization of the release coil 3 produces a flux which counteracts the magnetic attracting effect of permanent magnets 5, 5A, 5B, it is essential that the both ends 2a, 2b of channel-shaped yoke 2 be simultaneously removed from mating surface of the body 4. This involves a disadvantage that the attraction exerted by the permanent magnet cannot be eliminated unless the coil 3 is energized with an increased current flow. For this reason, in the prior art arrangement, the coil is connected with a capacitor having a high capacity which is in turn connected in shunt with a current supplying time constant circuit or power surface, in order to minimize the power dissipation of the source. Another difficulty of the described arrangements is manifest in the non-uniformity of movement of the magnet body as it is separated from the electromagnet. This results in the difficulty in adjusting the resilience of a coiled or torsion spring which is connected with the magnet body for separation thereof.

SUMMARY OF THE INVENTION

It is an object of the invention to provide a release electromagnet assembly which avoids the described disadvantages of a conventional release electromagnet having separate permanent magnet and electromagnet, by providing the permanent magnet with an attracting portion of a single polarity.

It is another object of the invention to provide a release electromagnet assembly which assures that a permanent magnet body is moved away from an end of the electromagnet which is adjacent to the limb thereof on which a release coil is disposed.

In accordance with the invention, an attracting portion of the permanent magnet is formed as a magnetic pole of single polarity, so that the flux therefrom passes through a magnetic path which is partly external to the yoke. When energized, a flux from the electromagnet counteracts the flux from the permanent magnet and extends through a magnetic path provided internally of the yoke, whereby the required level of energization is minimized. The influence of variations in the pole surface of the permanent magnet where it abuts against the yoke is minimized. The reduced power dissipation permits an increase in the effective life of a battery and also enables a full operation of the assembly when the battery performance is degraded at low temperatures. A battery of a low capacity can be used with the assembly, and the assembly is easy to manufacture.

In accordance with the invention, it is assured that the permanent magnet body is moved away from the yoke of the electromagnet at an end thereof which is associated with the limb on which the release coil is disposed. This facilitates an adjustment of the resilience of a coiled or torsion spring which is used to separate it from the yoke. Finally, a rapid and reliable movement of the permanent magnet body is assured.

DESCRIPTION OF PREFERRED EMBODIMENTS

Figure 1:
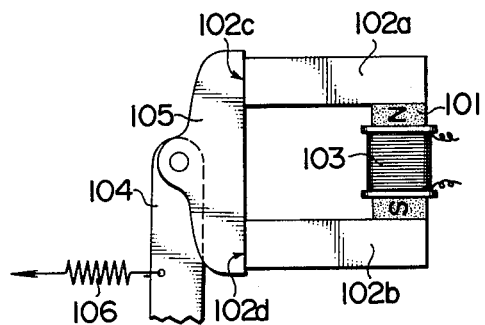
FIGS. 1 to 4 are plan views of several examples of conventional release electromagnet assembly.

Referring to FIG. 5, there is shown a release electromagnet assembly according to one embodiment of the invention. The assembly includes an electromagnet 11 which is constructed in a manner similar to conventional electromagnets. Specifically, it includes a channel-shaped yoke 12 formed of a magnetizable material such as ferrite, and which carries a release coil 13 disposed on one of its limbs. The opposite ends of the yoke 12 constitute attracted portions 12a, 12b. When coil 13 is energized, a loop $a_0$ extending internally of the yoke 12 is formed and the flux passing through the loop produces a magnetic pole at end 12b which repels the magnet 15.

A permanent magnet body 14 includes the permanent magnet 15 which is formed with an N-pole on the side located adjacent to the ends 12a, 12b of the yoke 12 and with an S-pole on the opposite side. The body 14 also includes an armature piece 16 of a magnetically soft material which is adhesively applied to the N-pole surface, and a mounting piece 19 also of a magnetically soft material which is adhesively and integrally secured to the S-pole surface of the magnet. The body 14 is biased away from the electromagnet 11 by a tension spring 21, but normally the attraction of the magnet 15 overcomes the resilience of spring 21 to hold the body 14 attracted to the ends 12a, 12b. A distinction of the arrangement of the invention over the prior art is found in the fact that the surface of the permanent magnet 15 which is adapted to abut against the ends 12a, 12b of the yoke 12 is of a single uniform polarity. Assuming that this surface is magnetized to N-pole as shown, the flux therefrom will extend through an external path represented by loop $b_0$ defined by one limb 12c of the yoke and the exterior space, and also through another external path formed by loop $c_0$ defined by the other arm 12d of the yoke 12 and the exterior space. Note that these paths are parallel to each other. The attraction of the magnet 15 will be at its maximum when areas 16a, 16b of the armature piece 16 are held attracted to the ends 12a, 12b, respectively, of the yoke.

Figure 5A:
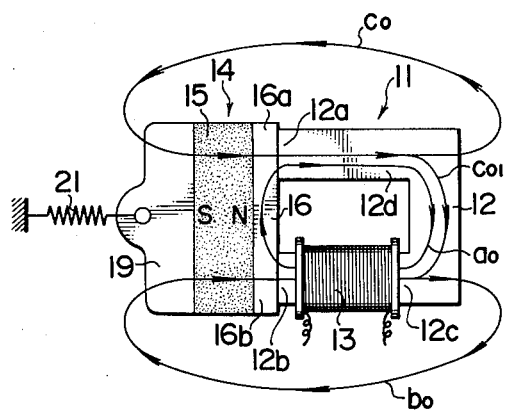
FIGS. 5A and B are plan views of a release electromagnet assembly according to one embodiment of the invention.
Figure 5B:
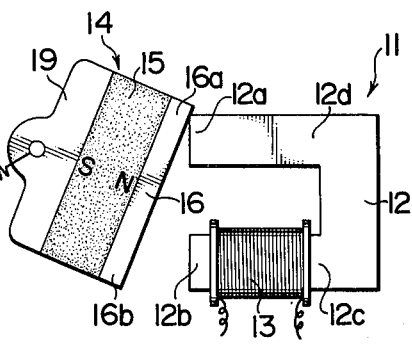

When the coil 13 is energized under this condition, the flux from the electromagnet 11 passes along an internal magnetic path defined by loop $a_0$, thereby producing a magnetic pole at the end 12b which repels the area 16b. The flux following the loop $a_0$ passes through the limb 12d in the same direction as the flux following the loop $c_0$ while it passes through the limb 12c in the opposite direction from the flux following the loop $b_0$, thus cancelling the latter to demagnetize the attracting end 16b. Consequently, a small current is sufficient for the energization of the coil 13 to move the area 16b of the armature piece away from the end 12b. It will be noted that part of the flux following the loop $c_0$ will be diverted to a branch loop $c_{01}$ through the highly permeable yoke as shown in FIG. 5A, which contributes to the cancellation of flux following the loop $b_0$. While no repulsion occurs between the area 16a and the end 12a, it will be understood that the resilience of spring 21 is sufficient to achieve a separation therebetween as shown in FIG. 5B whenever the area 16b is separated from the end 12b. By way of example, in an electromagnet assembly of a conventional design, a current flow on the order of from 60 to 100 mA is required for the energization of the coil in order to achieve a maximum attraction Pmax of 250 g and a minimum attraction Pmin of 50 g. By contrast, according to the invention, an electromagnet assembly of comparable size only requires a current flow of from 5 to 10 mA, which is as small as one tenth of the current level required in the conventional arrangement.

Figure 6:
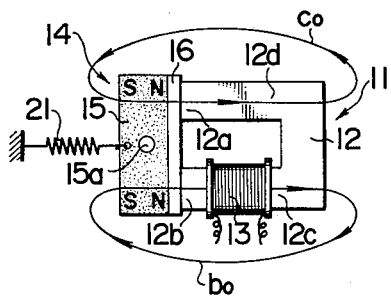
FIGS. 6 to 9 are plan views of other embodiments of the invention.

FIG. 6 shows another embodiment of the invention in which the mounting piece 19 is removed, and a movable member may be mounted by the use of a mounting hole 15a formed through the permanent magnet 15. The resulting arrangement is simple in construction though it is less efficient.

Figure 2A:
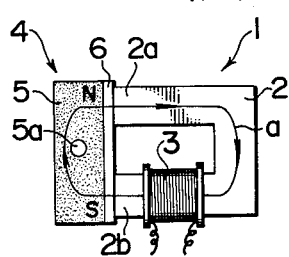
Figure 2B:
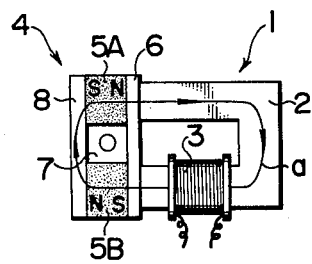
Figure 3:
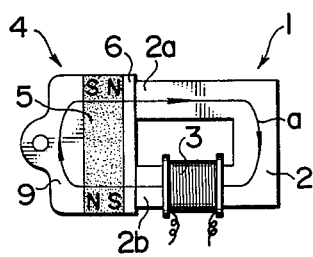
Figure 7:
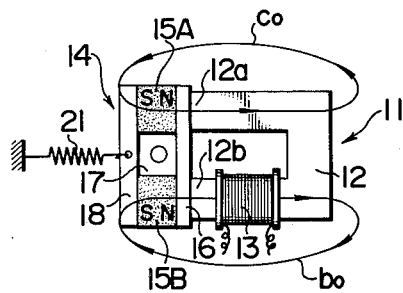

FIG. 7 shows a further embodiment in which the permanent magnet 15 is divided in two parts 15A, 15B which are juxtaposed with a non-magnetic material 17 interposed therebetween. The magnet structure is held sandwiched between an armature piece 16 and an iron piece 18. It will be seen that this corresponds to the arrangement shown in FIG. 2B, and that care must be taken to provide an equal axial length for the magnets 15a, 15b.

Figure 8:
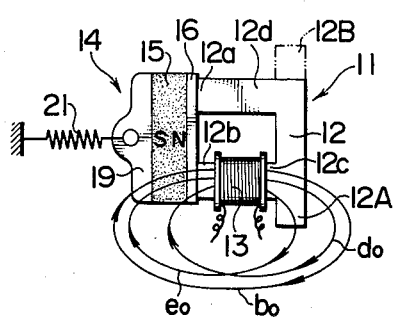

FIG. 8 shows another embodiment in which the rear end of the yoke 12 is provided with a projection 12A for enhancing the efficiency of the external magnetic path. The flux exiting the rear end of the yoke 12 includes a first portion entering a mounting piece 19 formed by an iron piece by following loop $b_0$, a second portion entering the end 12b by following loop $d_0$, and a third portion entering magnet 15 or armature piece 16 by following loop $e_0$. The attraction or maximum attraction Pmax can be increased when the proportion of the flux component following loop $b_0$ is increased. This may be achieved by causing the flux which exits the rear end of yoke 12 to be directed farther away. At this end, the projection 12a extends in a direction perpendicular to the limb 12c to define the flux loop $e_0$ which finds its way into the mounting piece 19. It should be understood that such projection may be formed on the other limb 12d, as indicated by phantom line 12B.

Figure 4:
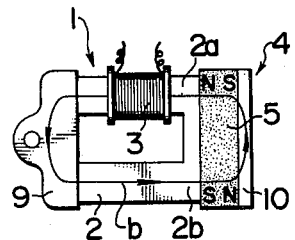
Figure 9:
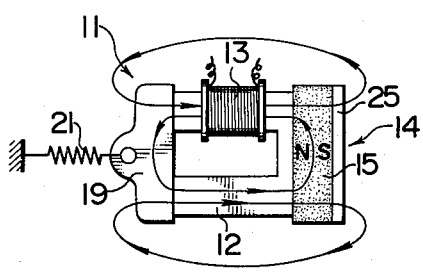

FIG. 9 shows an additional embodiment of the invention which corresponds to the arrangement shown in FIG. 4. In this instance, the electromagnet 11 is movable while permanent magnet body 14 is stationary. If the cost consideration permits a design using an increased size of magnet, a plate 25 formed of permalloy, soft magnetic iron or the like may be dispensed with while achieving the intended objects.

Figure 10A:
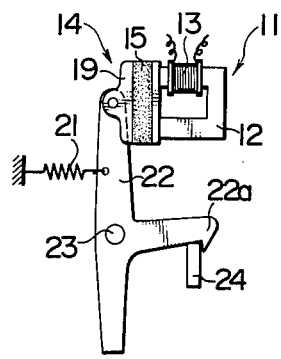
FIGS. 10A and B are plan views illustrating one exemplary use of the electromagnet assembly of the invention.
Figure 10B:
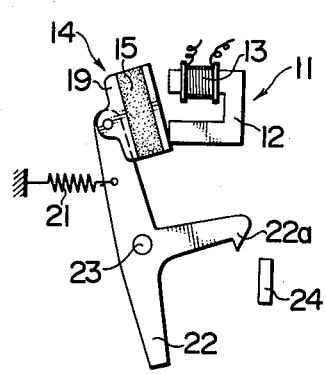

FIGS. 10A and B show the use of the electromagnet assembly shown in FIGS. 5A and B in constraining and releasing a lever 22 which represents an actual movable member. In FIG. 10A, a permanent magnet body 14 is held attracted to the electromagnet 11 whereby the lever 22 which is pivotally connected with the body 14 at its one end is rotated clockwise about a pivot 23 against the resilience of spring 21. The lever 22 is T-shaped and is formed with a hook 22a which constrains a displacement member 24. When the coil 13 is energized, the body 14 is moved away from the electromagnet as shown in FIG. 10B, whereby the lever 22 is urged by the spring 21 to rotate counter-clockwise about the pivot 23, thus allowing the displacement member 24 to be released from the constraint by the hook 22a.

Figure 11:
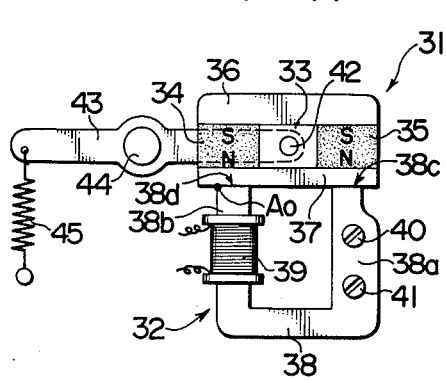
FIGS. 11 and 12 are plan views illustrating other use of the electromagnet assembly.
Figure 12:
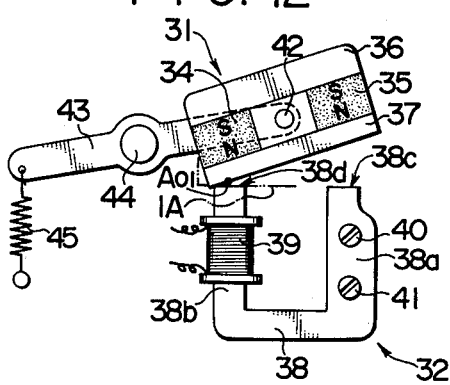

FIGS. 11 and 12 illustrate another example of use of the release electromagnet assembly of the invention. In this embodiment, a permanent magnet body 31 comprises a pair of permanent magnets 34, 35 which are separated by a spacer 33 formed of non-magnetic material such as aluminium. The magnetization of the magnets are vertically oriented with S-poles at their upper ends. A pair of plates of non-magnetic iron or a permalloy are adhesively secured to the upper and lower ends of the magnets to provide a yoke 36 and an armature 37. It will be seen that the armature 37 has a uniform polarity such as N-pole, which is determined by the polarity of the magnets 34, 35. An electromagnet 32 comprises a channel-shaped yoke 38 formed of a ferromagnetic material such as ferrite and having first and second limbs 38a, 38b, and a coil 39 disposed on the limb 38b. The coil 39 is arranged to produce a flux of a polarity which opposes that produced by the magnets 34, 35 at the armature 37 when it is energized. Limb 38a is secured to a stationary member, not shown, by means of set screws 40, 41 while the spacer 33 is pivotally connected with one end of a support rod 43 by means of a stud 42. The support rod 43 may comprise a shutter closing member of an electrical shutter of photographic camera, and is pivotally mounted on a shaft 44. A coiled spring 45 engaging the other end of the rod urges it to rotate counter-clockwise about the shaft 44. The ends 38c, 38d of the limbs of the yoke 38 represent attracted ends, against which the armature 37 is held attracted as a result of the flux from the magnets 34, 35. The spring 45 has a resilience which is smaller in magnitude than the attractive force exerted by the magnets 34, 35, but which is of a sufficient magnitude to move the rod 43 away from the electromagnet 32 whenever the coil 39 is energized.

When the coil 39 is energized, a flux is produced at the end 38c which repels the armature 37. The repulsion is effective, in combination with the resilience of spring 45 to move the magnet body 31 away from the electromagnet 32, thus allowing a counter-clockwise rotation of the support rod 43.

Figure 13:
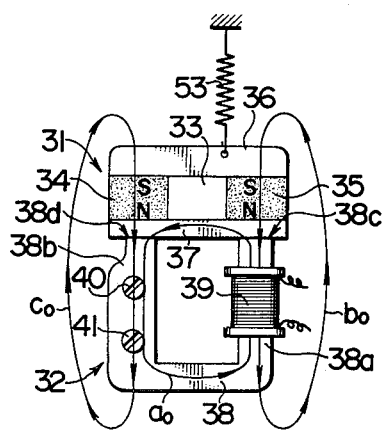
FIGS. 13 and 14 are plan views of a further embodiment.
Figure 14:
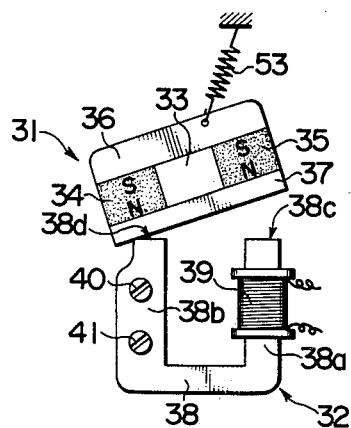

FIGS. 13 and 14 show a modified arrangement in which coil 39 is disposed on the limb 38a having an end from which the magnet body 31 is initially separated from the electromagnet 32. The other limb 38b of the yoke 38 is secured to a stationary member, not shown, by set screws 40, 41 while the yoke 36 of the permanent magnet body 31 is engaged by a coiled spring 53 at a location nearer the end 38c of the yoke 38. It is to be understood that spring 53 biases the body 31 in a direction away from the electromagnet 32 with a force of a magnitude which is less than the attractive force applied by the permanent magnets 34, 35. It will be noted that the body 31 may be pivotally mounted on a support rod such as that shown at 43 in FIG. 11.

When coil 39 is not energized (FIG. 13), flux from magnets 34, 35 will follow an external path defined by loop $b_0$ extending through limb 38a and entering yoke 36, and through another external path defined by loop $c_0$ extending through the other limb 38b and entering yoke 35. As a result of such flux, the armature 37 is held attracted to the ends 38c, 38d. When coil 39 is energized, it produces a flux which follows an internal magnetic path defined by loop $a_0$ extending through end 38c, armature 37, end 38d and limb 38b and entering limb 38a. As a consequence, a repulsion occurs at end 38c to repel the armature 37 and the body 31. Consequently, the body 31 is released from the electromagnet 32 initially from the end 38c associated with the limb on which the coil 39 is disposed.

Figure 15:
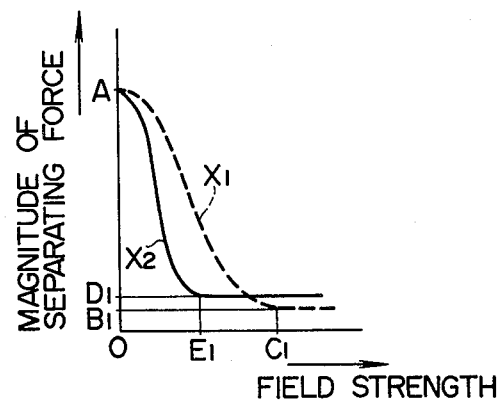
FIG. 15 graphically shows the relationship between the magnitude of separating force and the field strength of the electromagnet according to the invention.

FIG. 15 graphically shows the relationship between the strength of the magnetic field produced by the electromagnet 32 and the magnitude of force which is required to separate the body 31 from the electromagnet 32, or the resilience of coiled spring 53. It will be seen that the maximum force A will be required when the magnetic force produced by the electromagnet is null while a decreasing force is required as the magnetic force increases. However, a given level of separating force is required for any increase in the magnetic force above a given level. It will be seen that the minimum value of the magnetic force corresponding to such magnitude of separating force will be a stable value. The smaller the stable value, the more effectively the apparatus operates and the less the power dissipation.

By experiments, it is found that the operating characteristic of the assembly shown in FIG. 11 is represented by curve $X_1$ shown in dotted lines. Curve $X_2$ shown in solid line corresponds to the assembly shown in FIG. 13. it is clearly seen that the stable value $C_1$ of magnetic force for the minimum magnitude of separating force $B_1$ on the curve $X_1$ is greater than the stable value $E_1$ of magnetic force for the minimum magnitude of separating force $D_1$ on the curve $X_2$. In other words, the assemblies shown in FIGS. 13 and 14 are more effective, requiring less power dissipation. It is believed that such results are due to the fact that the leakage flux from the coil 39 contributes to the separation of the body 31.

Figure 16:
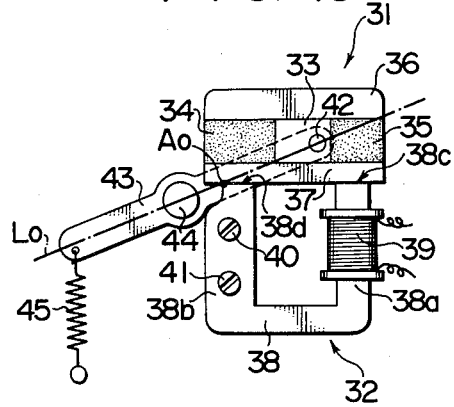
FIGS. 16 and 17 are plan views of an additional embodiment.
Figure 17:
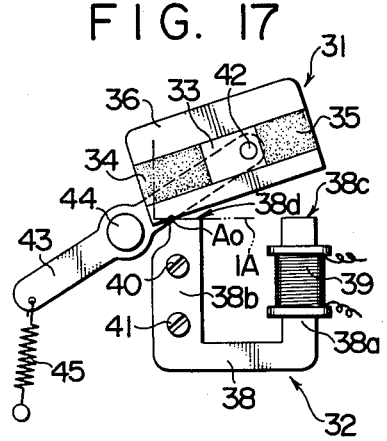

FIGS. 16 and 17 show another arrangement in which coil 39 is disposed on limb 38a having an end from which the permanent magnet body 31 is initially separated. Permanent magnet 35 which is located nearer the limb 38a carrying the coil 39 has a magnetization less than that of the permanent magnet 34 aligned with the other limb. In addition, a pivotal connection 42 of the permanent magnet body 31 with the support rod 43 is biased toward the end 38c associated with the limb carrying the coil 39 in a manner such that the pivotal connection 42 and the axis 44 of the rod 43 are both located in substantial alignment with a rectiliner line $L_0$ together with an edge $A_0$ on the other end 38d of the other limb where the armature 37 bears against the electromagnet 32.

The reduced magnetization of the magnet 35 which is located nearer the coil 39 contributes to providing a more reliable separation of the body 31 from the limb carrying the coil 39. While the magnet 35 is shown as reduced in size compared with the magnet 34, the sole purpose of this is to emphasize that the magnet 35 has a reduced magnetization.

Figure 18:
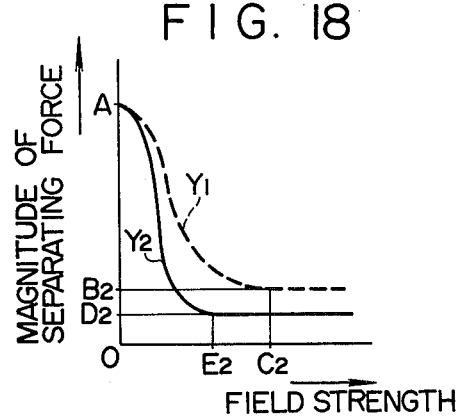
FIG. 18 is a graph similar to FIG. 15 illustrating the relationship between the magnitude of separating force and the field strength of the electromagnet for the assembly shown in FIGS. 16 and 17.

When the pivotal connection 42 between the body 31 and support rod 43 is displaced toward the end 38c as shown in FIG. 16, it is possible to achieve an increased distance by which the body 31 is moved away from the end 38c, without increasing the angle of rotation of the support rod 43, thus permitting an electromagnet of a reduced magnetic power to be used. FIG. 18 graphically shows a relationship between the magnitude of a separating force and the magnetization. The curve $Y_1$ shown in dotted line fashion represents such relationship when the location of the pivotal connection 42 is not biased while curve $Y_2$ shown in solid line represents the corresponding relationship when the location of the pivotal connection is biased. It will be seen that both the field strength and the separating force can be reduced when the location of the pivotal connection is biased. In this Figure, $B_2$ and $D_2$ represent given levels of the magnitude of separating force while characters $C_2$ and $E_2$ represent corresponding stable values of the magnetization.

When the pivotal connection 42 and the axis 44 are substantially colinearly aligned with the edge $A_0$ (see FIG. 16), the point of engagement is not displaced from the edge $A_0$ when the body 31 is removed from the electromagnet 32 as shown in FIG. 17, thus assuring a reliable operation of the apparatus. By contrast, in the arrangement of FIG. 11, these three points are not located on a common line, so that the point of engagement will be displaced from the edge $A_0$ when the coil 39 is not energized to point $A_{01}$ shown in FIG. 12 when the coil 39 is energized to move the body 31 away from the electromagnet. This indicates a sliding movement of the body 31 before it is moved away from the electromagnet 32, representing an unreliable operation of the body 31 as it is separated. Dotted lines 1A shown in FIGS. 12 and 17 represent the position of the body 31 before it is separated.

Figure 19:
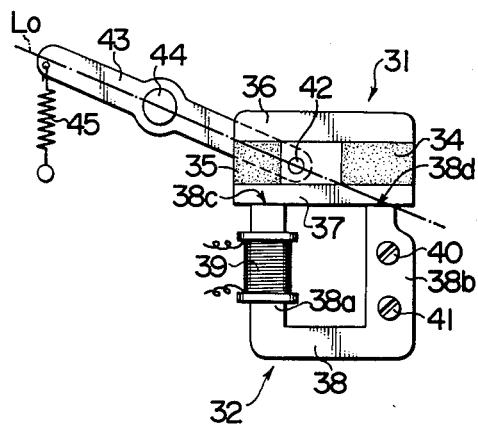
FIGS. 19 and 20 are plan views of still another embodiment.
Figure 20:
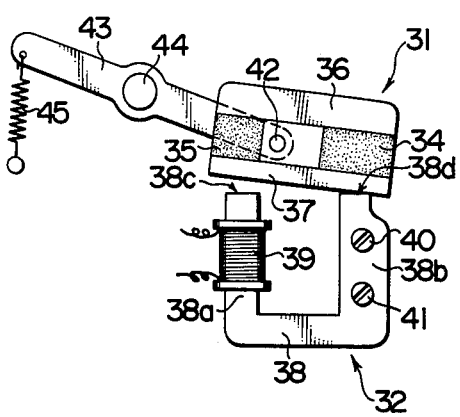

FIGS. 19 and 20 show a modification in that the armature 37 is separated from the end of the left-hand limb, rather than the right-hand limb, of the electromagnet. The design considerations are similar to those described in connection with FIG. 16. It will be seen that as compared with the arrangement of FIGS. 16 and 17, both body 31 and electromagnet 32 assume reversed positions laterally and the support rod 43 is displaced to an upper position. In other respects, the arrangement is similar to those of the previous embodiment, and therefore will not be described specifically.

Figure 21:
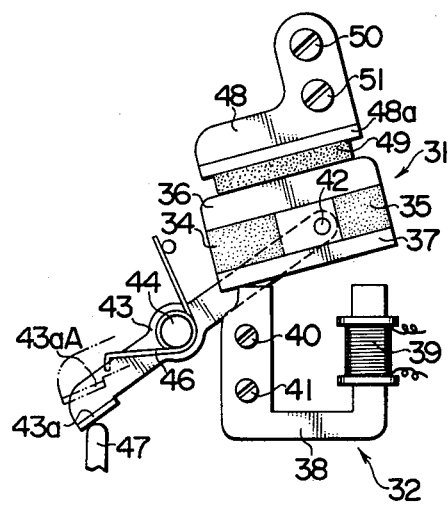
FIG. 21 is a plan view of a release electromagnet assembly of the invention as assembled into a photographic camera.

FIG. 21 shows the use of the apparatus of the invention shown in FIG. 16 as incorporated into a photographic camera. In this instance, the support rod 43 serves as a shutter closing member which is urged to rotate by a torsion spring 46 disposed on the axis 44. The rod 43 has an operating end 43a which is located adjacent to a shutter opening and closing mechanism, not shown, and is also located in opposing relationship with a charging rod 47. A cushion member 49 is mounted on a surface 48a of a stop 48 for the abutment of the body 31 thereagainst when the latter is separated. The stop 48 is secured to a stationary member, not shown, by set screws 50, 51. Initially, the coil 39 is not energized, and the body 31 is held attracted to the electromagnet 32 as a result of the magnetization of the magnets 34, 35. The support rod 43, representing a movable member, is constrained, with its end 43a located at position 43aA shown in dotted lines. However, when the coil 39 is energized to move the body 31 away from the electromagnet 32 to the position shown in solid line, a shutter closing operation takes place. It is to be understood that the charging rod 47 returns the support rod 43 to its dotted line position in response to a film winding operation, whereby the body 31 is returned to the constrained position. It should be understood that in the practice of the invention, either electromagnet or permanent magnet body may be chosen as a movable member.

What is claimed is:

1. A release electromagnet assembly comprising an electromagnet including a U-shaped yoke having ends which are subject to a magnetic attraction by a permanent magnet and also including a release coil disposed on one limb of the yoke for producing a flux which passes through a magnetic path formed integrally of the yoke and which produces a magnetic pole at one of the ends which opposes the magnetic attraction, and a permanent magnetic body including said permanent magnet, the magnet having a magnetic pole of single polarity which is located adjacent to both ends of the yoke so that the magnetic flux from the magnet partly passes through a magnetic path located externally of the yoke when the ends of the yoke are held attracted to the permanent magnet.

2. A release electromagnet assembly according to claim 1 in which the yoke is partly formed with a projection which forms the external magnetic path.

3. Release electromagnet assembly according to claim 1 in which the permanent magnetic body comprises a mounting member for mounting it on a movable member, an armature formed by a magnetically soft material, and said permanent magnet, the movable member being constrained in position when the body is held attracted to the electromagnet which is stationary.

4. Release electromagnet assembly according to claim 3 in which the armature is formed of a magnetizable material such as permalloy, soft magnetic iron or the like.

5. The release electromagnet assembly according to claim 1 in which the permanent magnet is comprised of first and second permanent magnet members each being substantially aligned with one of the free ends of said U-shaped yoke.

6. The release electromagnet assembly according to claim 5 in which the attractive force of one of said permanent magnets is greater than the attractive force of the remaining one of said permanent magnets.

7. The release electromagnet assembly according to claim 1 further including biasing means normally urging said permanent magnet toward disengagement with said yoke; means coupling said biasing means to said permanent magnet body at a point on said body so as to exert equal pulling forces upon the ends of said permanent magnet body.

8. The release electromagnet assembly according to claim 1 further including biasing means normally urging said permanent magnet toward disengagement with said yoke; means coupling said biasing means to said permanent magnet body at a point on said body so as to exert unequal pulling forces upon the ends of said permanent magnet body.

9. The release electromagnet assembly according to claim 7 wherein said means for coupling the biasing force to said permanent magnet body comprises a swingable arm arranged to pivot said permanent magnet body relative to said U-shaped yoke so as to constrain the movement of the permanent magnet member to rotational movement by the elimination of any sliding movement.

10. A release electromagnet assembly comprising an electromagnet including a permanent magnet, a U-shaped yoke having free ends which are subject to a magnetic attraction by said permanent magnet, and a release coil arranged to produce magnetic flux through said yoke and said permanent magnet in order to produce a magnetic pole at one end of the free ends of said U-shaped yoke which opposes the magnetic attraction; and a permanent magnet body including said permanent magnet, said permanent magnet having a magnetic pole of a single polarity which is located adjacent to both free ends of the yoke so that magnetic flux from the permanent magnet forms a flux path which includes the permanent magnet, one arm of said yoke, and the free space external to said permanent magnet and said yoke when the free ends of the yoke are held attracted to the permanent magnet.

* * * * *

UNITED STATES PATENT AND TRADEMARK OFFICE
CERTIFICATE OF CORRECTION

PATENT NO. : 4,237,439
DATED : December 2, 1980
INVENTOR(S) : Kazuyuki Nemoto

It is certified that error appears in the above—identified patent and that said Letters Patent is hereby corrected as shown below:

Column 1, line 38, change "magntide" to --magnitude--.

Column 8, line 61, change "integrally" to --internally--.

Signed and Sealed this

Twelfth Day of May 1981

[SEAL]

Attest:

RENE D. TEGTMEYER

*Attesting Officer*    *Acting Commissioner of Patents and Trademarks*